June 12, 1923.

C. OFFENHAUSER

APPARATUS FOR RENDERING

Filed June 4, 1920

INVENTOR
Christopher Offenhauser,
BY
ATTORNEYS

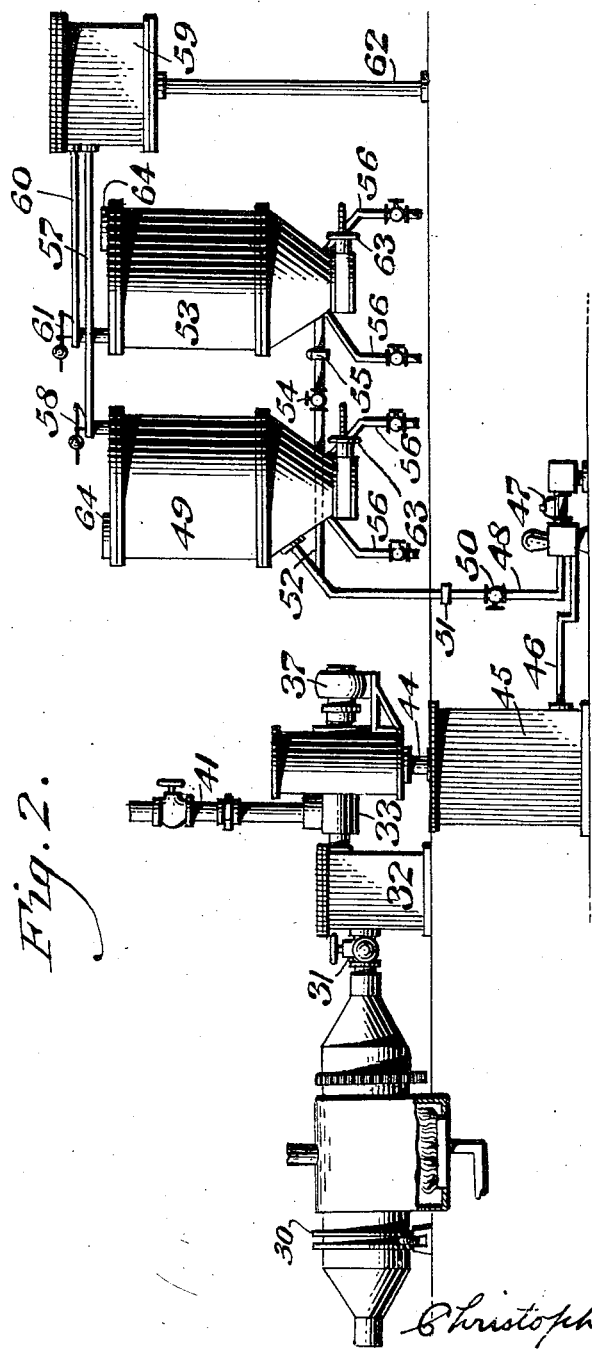

June 12, 1923.
C. OFFENHAUSER
1,458,722
APPARATUS FOR RENDERING
Filed June 4, 1920
3 Sheets-Sheet 3
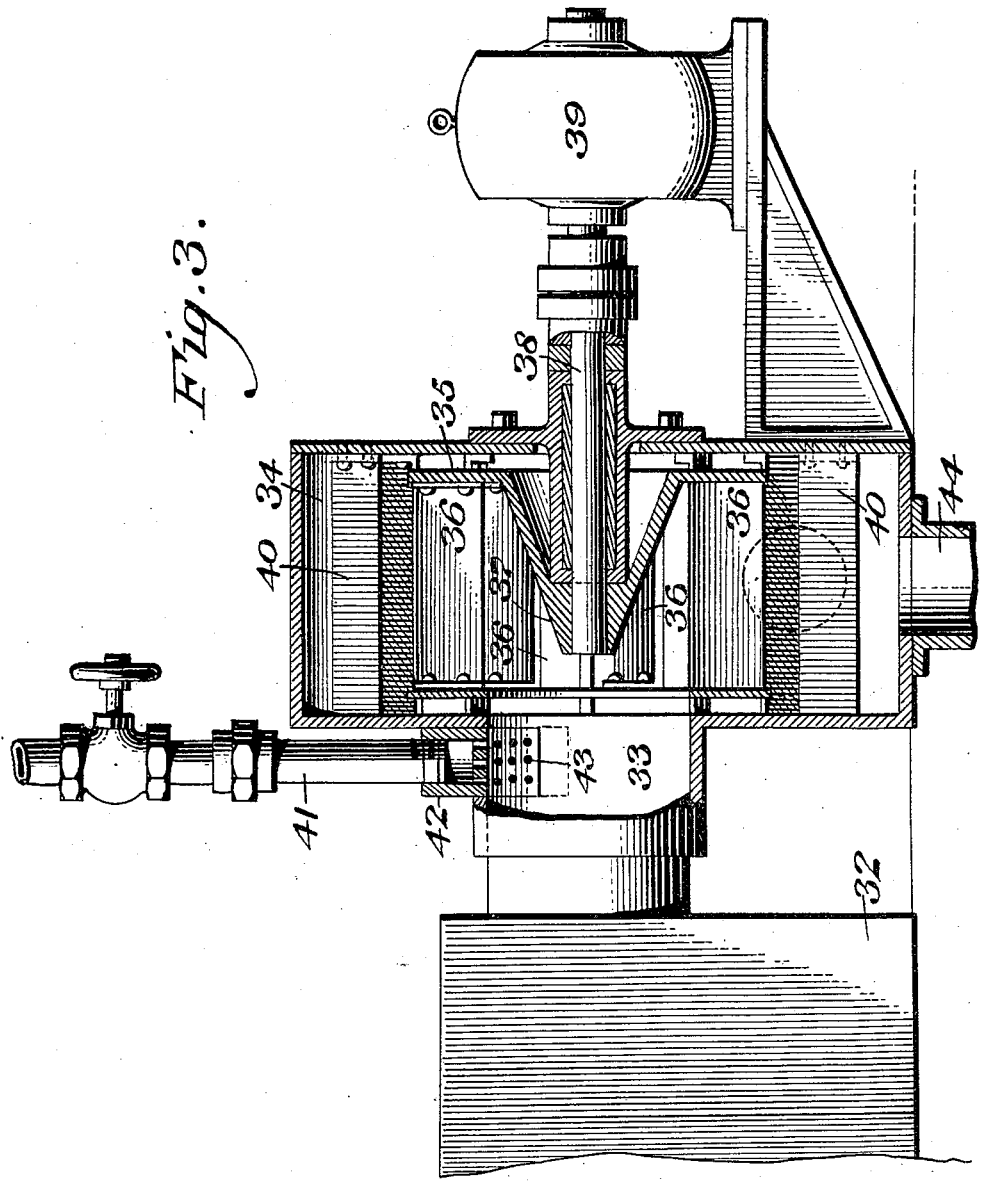

Patented June 12, 1923.

1,458,722

UNITED STATES PATENT OFFICE.

CHRISTOPHER OFFENHAUSER, OF PHILADELPHIA, PENNSYLVANIA.

APPARATUS FOR RENDERING.

Application filed June 4, 1920. Serial No. 386,622.

*To all whom it may concern:*

Be it known that I, CHRISTOPHER OFFENHAUSER, a citizen of the United States, residing in the city and county of Philadelphia, State of Pennsylvania, have invented a new and useful Apparatus for Rendering, of which the following is a specification.

The object of my present invention is to devise a novel method of rendering and a novel construction of apparatus for carrying out such method whereby the obnoxious odors which have always been present in the methods of rendering heretofore employed will be entirely eliminated.

In the rendering of animal and vegetable matter to extract the fats and oils, for example from waste meats, fat, bones, offal, dead animals and other material, it is customary to place them in a container in which they are subjected for a number of hours to the action of steam at a pressure, ordinarily, of about forty-five pounds.

The obnoxious odors which are given off during this cooking, boiling or digesting precess are a source of great annoyance not only to workmen in the plant but to every one in the neighborhood, and it is the primary object of my present invention to overcome these obnoxious odors which occur during the cooking operation.

With the above in view, my present invention comprehends a novel method of rendering wherein sulphurous gas or sulphurous gas diluted in water is forced into the digester at a pressure higher than the pressure within the digester, with the result that the obnoxious gases are destroyed. The sulphur introduced in this manner acts to check fermentation of the animal and vegetable matters, directly upon coming into contact with the material, and largely increases the amount of fats and oils which can be extracted. It also has the action of bleaching the tallow, grease, fats and oils extracted, irrespective of whether they are of an animal or vegetable origin.

I am further enabled to shorten the drying process of the refuse to a considerable degree owing to the fact that a larger percentage of fats and oils are extracted than has been deemed possible under prior methods employed.

My invention further comprehends a novel method of rendering in which sulphur is burned and the gas produced is compressed to a pressure higher than the pressure in the digester, and is then passed into the digester during the cooking operation. The fumes which pass from the digester are passed through a condenser which discharges into the sewer.

My invention further comprehends a novel method of rendering wherein sulphur is burned to produce a gas. Sulphur gas is then absorbed in water and the mixture or solution of sulphur gas and water is forced by means of a high pressure pump into the digesters either prior to or during the cooking operation. The cooking or digesting is ordinarily effected by passing steam into the digester.

My invention further comprehends novel constructions and arrangements of apparatus whereby the desired results can be attained.

Other novel features of construction and advantage will hereinafter more clearly appear in the detailed description of my invention.

For the purpose of illustrating my invention, to show different manners in which my novel method can be carried out in practice, I have shown in the accompanying drawings typical embodiments of constructions and arrangements which can be advantageously employed. It is, however, to be understood, that such constructions and arrangements are typical only, and that the various instrumentalities of which my invention consists can be variously arranged and organized without departing from the spirit or scope of the invention or sacrificing any of its advantages.

Figure 2 represents diagrammatically another embodiment of my invention.

Figure 3 represents, in section, a gas absorbing device which may be employed as seen in Figure 2.

Similar numerals of reference indicate corresponding parts.

Figure 1:
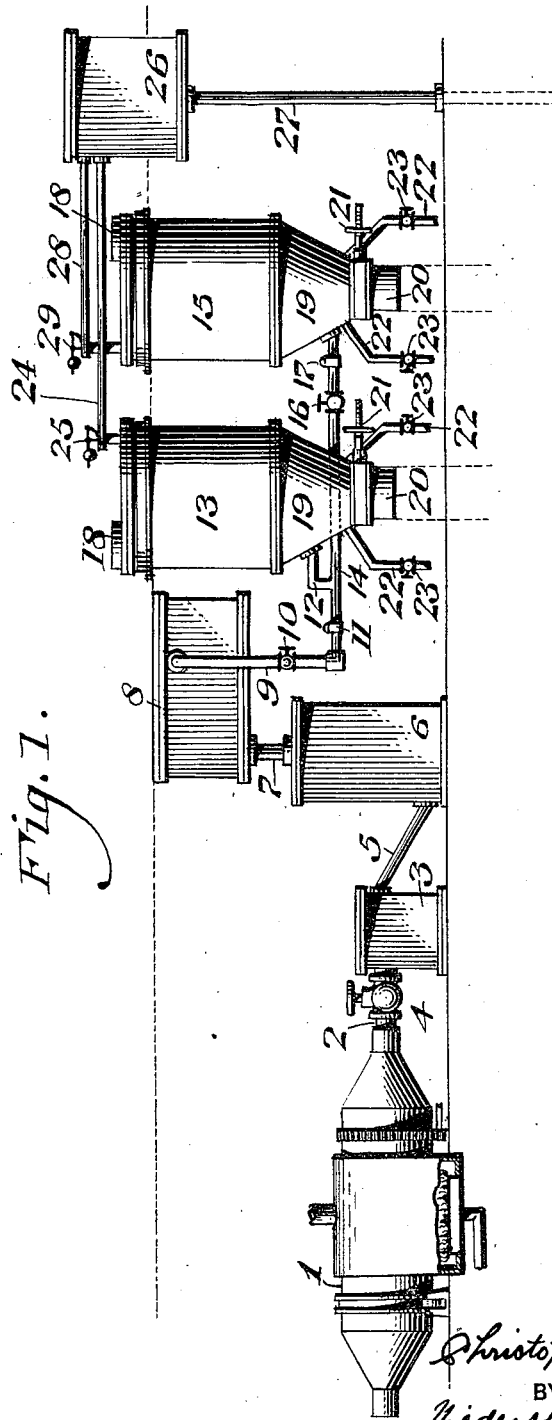
Figure 1 represents diagrammatically a novel construction and arrangement of mechanism embodying my invention, and by means of which my novel method can be carried out in practice.

Referring to the drawings.

Referring first to the embodiment seen in Figure 1, 1 designates a sulphur burner of any desired or well known construction and which may or may not be rotated during the burning process. The sulphur gas generated passes to a conduit 2 into a receiving chamber 3, the conduit 2 being provided with a controlling band 4. The receiving chamber 3 communicates by means of a conduit 5 with a compressor 6 of any desired or conventional construction which compresses the gas and passes it through the conduit 7 into a storage tank 8. The storage tank 8 has communicating with it a conduit 9 provided with a controlling valve 10 and a check valve 11. The conduit 9 communicates by means of a branch 12 with the lower end of a digester 13 and it also communicates by means of a branch 14 with another digester 15, the branch 14 being provided with a controlling valve 16 and with a check valve 17. It will be understood that in practice a battery of digesters are employed each of which communicates by means of a valve controlled conduit containing a check valve with the storage tank 8.

Each digester is ordinarily provided at its upper end with a manhole 18 and its lower end is cone-shaped, as indicated at 19, and communicates with a discharge conduit 20 which latter is provided with a controlling valve 21. One or more steam pipes 22 leading from a boiler or other source of steam supply communicate with the lower end of each digester and these steam pipes are each provided with a controlling valve 23. The digester 13 has leading from it at its upper end a conduit 24 having a safety valve 25, the conduit 24 communicating with a condenser 26 having a discharge line 27 communicating with the waste water pipe or sewer. The digester 15 in a similar manner has a conduit 28 communicating with the upper end of the digester 15 and with the condenser 26. The conduit 28 is provided with a safety valve 29.

In the operation of this embodiment of my invention, the sulphur gas, produced in the sulphur burner 1, passes into a receiving chamber 3, and is then forced by means of the compresser 6 into the storage battery 8. The material to be rendered is placed in the digesters, such as 13 and 15, and the valves 23 are opened. The steam at a pressure of about forty five pounds passes into the digesters and the material in them is subjected to steam pressure ordinarily for a period of six to eight hours. During this cooking operation the valves such as 10 and 16 are opened to permit the requisite amount of sulphur gas in a concentrated condition to pass into the digesters and become intimately commingled with the materials being rendered so that the obnoxious gases are destroyed, the material is sweetened and the sulphur has a preservative action on the material. Any fumes which escape pass through the conduits such as 24 and 28 and pass to the condenser 26.

It will thus be seen that there is no opportunity for gases containing obnoxious odors to pass to the atmosphere, since any obnoxious odors which are created are overcome, eliminated or absorbed as fast as they are formed, due to the action of the sulphur gas.

In the embodiment seen in Figure 2, instead of introducing the sulphur as a gas into the digester, I produce the sulphur gas and absorb such gas in water and then introduce the sulphur containing water into the digesters. In this embodiment 30 designates the sulphur burner from which the gas created passes through the valve controlled conduit 31 into a receiving tank or chamber 32. The gas is drawn from the chamber 32 by means of an absorbing fan 33, the detailed construction of which will be best understood by reference to Figure 3, it being understood that this is typical only of one construction which can be advantageously employed in commingling the sulphur gas with water, and I make no claim to the special construction of this absorbing fan.

The receiving chamber 32 communicates with the inlet 33 of the chamber 34 within which revolves the rotor or fan 35 having the blades 36 and a cone-shaped central portion 37 which deflects the incoming current towards the blades 36. The cone shaped portion 37 is mounted on a shaft 38 driven by a motor 39. 40 designates fixed baffle plates extending across the chamber 34. 41 designates a valve controlled water conduit which discharges into the chamber of a casing 42 which has a number of restricted ports 43 which open into the inlet 33. The discharge conduit 44 communicates with a storage tank 45 from which leads a conduit 46 to a high pressure pump 47, the discharge of which communicates with a conduit 48 which opens into the bottom of the digester 49. The conduit 48 is provided with a valve 50 and with a check valve 51. A branch conduit 52 leads from the conduit 48 to another digester 53, and this conduit 53 is provided with a controlling valve 54 and with a check valve 55. One or more valve controlled steam pipes 56 communicate with the lower end of each digester. The digester 49 is provided with a conduit 57 communicating with a condenser 59 which is provided with a safety valve 58, the digester 53 communicating with the condenser 59 by means of a conduit 60 which is provided with a safety valve 61. 62 is the discharge from the condenser 59. Each digester is provided with a valve 63 controlling the discharge of material from it and with a manhole 64 through which the material is introduced into the digesters.

The operation of this embodiment of my invention will now be readily apparent and is as follows:—

The gas formed in the sulphur burner 30 passes into the receiving chamber 32, and, as the fan is revolving, the gas is drawn into the fan chamber 34 and discharged through the conduit 44. During this operation, water is admitted through the pipe 41 so that it passes into the incoming stream of gas passing through the inlet 33 and is beaten up by the fan blades and baffle plates, so that the gas is intimately commingled with the water, and the saturated solution of sulphur gas is formed which passes into the receiving tank 45. This saturated solution of sulphur gas is forced by means of the high pressure pump 47 into the digester into which the steam is also passing through the conduits 56, so that the material being rendered is subjected to the action of the sulphur gas which has been absorbed in the water, during the cooking operation. In this manner, I destroy, eliminate or overcome any obnoxious gases, and I thus eliminate and overcome the objections which have heretofore been present in manufacturing plants which are employed in rendering material of the character specified.

The conduit through which the sulphur gas or sulphurous acid are passed into the digesters are provided with check valves, and I employ a preponderance of pressure on the gas or on the liquid containing gas.

It will be apparent that in accordance with my present invention, I employ a gas of such nature that it contains a component of sulphur in a gaseous form and this sulphur gas can be generated in any desired manner. I have shown herein a novel type of sulphur burner in which the casing or retort 1 is adapted to be rotated, the sulphur being placed within the retort and a controllable air inlet being provided. The retort is surrounded by a casing into which extends or discharges a source of heat such as, for example, a burner, so that during the revolution of the retort, the articles will be heated thereby creating a gas, so that a sulphurous gas is employed which may be an oxide.

Where I refer to "sulphur gas" in the claims, it is intended to cover any form of gas in which sulphur is present. In practice, I preferably employ a sulphurous gas such as sulphur dioxide.

In so far as I am aware, I am the first in the art to inject sulphur gas or a solution of sulphur gas into the material being rendered during the cooking operation or to inject such gas or gas solution into the material being rendered during the cooking operation at a pressure higher than the steam pressure in the digesters, and it is to be understood that my claims to such features are to receive the broad and generic interpretation to which a pioneer in this art is entitled.

The obnoxious odors are generated or created during the cooking or digesting operation or, in other words, during the time the material being rendered is subjected to the action of the steam, and if these odors are not eliminated or overcome during the cooking operation they escape into the building whenever the safety valve opens. After the obnoxious gases are eliminated and the cooking operation has been effected, the fats and oils are withdrawn from the digesters and the solid material is also withdrawn from the digesters and subjected to a drying process so that the by-products thus formed can be used as a fertilizer. I am enabled in accordance with my present method to materially reduce the cost of the operation since a greater quantity of fats and oils can be abstracted and the time involved in drying the refuse is materially reduced, with consequent reduction in the cost of the drying operation.

The sulphur also has a tendency to check the fermentation in the animal and vegetable matters and also bleaches the tallow, fats and oils of either animal or vegetable origin so that a higher grade product is produced.

It will now be apparent that I have devised a novel and useful method of rendering which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:

1. An apparatus for rendering, comprising a sulphur burner, a commingling device to which the gas is led from the sulphur burner and having means to spray water into the incoming gas, a collecting tank for the gas solution, a digester, means to pump the gas solution from said tank into said digester, and means to introduce steam into said digester.

2. An apparatus for rendering, comprising a sulphur burner, a commingling device to which the gas is led from the sulphur burner and having means to spray water into the incoming gas, a collecting tank for the gas solution, a digester, means to pump the gas solution from said tank into said digester, means to introduce steam into said digester, a conduit communicating with said digester, a safety valve in said conduit, and a condenser into which said conduit discharges.

3. An apparatus for rendering, comprising a sulphur burner, mechanism for absorbing in water the sulphur gas generated in said burner, a tank to receive the gas solution, a high pressure pump having its inlet in communication with said tank, a digester, a conduit communicating with said digester and said high pressure pump, a check valve in said conduit, a condenser in communication with said digester and means to introduce steam into said digester.

4. An apparatus for rendering, comprising a sulphur burner, means to absorb in water the gas generated, a digester, means to introduce steam into the digester to cook the material to be rendered, and means to pump under high pressure the sulphur containing water into said digester.

CHRISTOPHER OFFENHAUSER.

Witnesses:
 H. S. FAIRBANKS,
 F. A. NEWTON.